United States Patent [19]
Yamazaki et al.

[11] Patent Number: 5,292,812
[45] Date of Patent: Mar. 8, 1994

[54] ADHESIVE OF EPOXY RESIN, CTBN AND MALEIMIDE

[75] Inventors: Hajime Yamazaki, Hadano; Hiroyuki Wakamatsu, Kawasaki; Toshinobu Takahashi, Kanagawa; Naoya Adachi, Hiratsuka, all of Japan

[73] Assignee: The Yokohama Rubber Co., Ltd., Tokyo, Japan

[21] Appl. No.: 32,701

[22] Filed: Mar. 17, 1993

Related U.S. Application Data

[63] Continuation of Ser. No. 644,917, Jan. 23, 1991, abandoned.

[30] Foreign Application Priority Data

Jan. 24, 1990 [JP] Japan ................................. 2-12512

[51] Int. Cl.$^5$ ..................... C08L 63/02; C08L 63/04; C08L 63/10
[52] U.S. Cl. .................................... 525/112; 525/486; 525/488; 525/502; 525/524; 525/527; 525/530
[58] Field of Search ............... 525/112, 113, 486, 488, 525/502, 524, 527, 530

[56] References Cited

U.S. PATENT DOCUMENTS

| | | | |
|---|---|---|---|
| 4,404,330 | 9/1983 | Ikeguchi | 525/329.3 |
| 4,743,647 | 5/1988 | Domeier | 525/205 |
| 4,780,507 | 10/1988 | Gaku et al. | 525/113 |

*Primary Examiner*—Robert E. Sellers
*Attorney, Agent, or Firm*—Finnegan, Henderson, Farabow, Garrett & Dunner

[57] ABSTRACT

Adhesive compositions of a selected class of epoxy resins combined with a selected class of carboxylic group-containing acrylonitrile-butadiene and methacrylonitrile-butadiene copolymers, maleimide derivatives and an imidazole compound. The resultant compositions are electrically insulative, thermally resistant, highly capable of fabrication at low pressure and storage stable.

8 Claims, No Drawings

ADHESIVE OF EPOXY RESIN, CTBN AND MALEIMIDE

This application is a continuation of application Ser. No. 07/644,917, filed Jan. 23, 1991, now abandoned.

BACKGROUND OF THE INVENTION

1. Field of the Invention

This invention relates generally to adhesive compositions and more particularly to such a composition having special utility in the fabrication of electronic equipment.

2. Description of the Prior Art

Electronic equipment has become more and more economical in weight and smaller in dimension. This in turn calls for printed circuitry of increased compactness and multiplied construction. Glass epoxy prepregs find wide application in assembling or otherwise laminating a dielectric substrate with a copper pattern to thereby form a printed wiring board. Such type of prepreg, derived by impregnating an epoxy resin into fibrous glass, has been found unsatisfactory for reasons given here and below.

To remove air entrained in the prepreg, the foregoing mode of assembly is necessarily effected with a two-stage rise of temperatures and at a pressure as high as 40 kg/cm$^2$. These conditions will in most cases produce a printed wiring board having residual strain which results from the heat and pressure during lamination and will eventually lead to pattern failure. Alternatively, it has been proposed that a composition made up of an epoxy resin and an acrylonitrile-butadiene rubber (NBR) be used in place of a glass epoxy prepreg. This composition, though able to be laminate at low pressure, is susceptible to insufficient electrical characteristics particularly with time under high temperature and humidity conditions. In such instance the decline in electrical quality is due primarily to the presence of the NBR. That problem is thought to be alleviated by the replacement of NBR with a carboxyl group-containing NBR rubber. NBR rubbers of this type are highly compatible and crosslink with the epoxy resin and hence are capable of improving electrical properties. The last type of composition, however, undergoes gradual reaction even at room temperature and hence has poor stability during storage.

SUMMARY OF THE INVENTION

The present invention seeks to provide a new adhesive composition which excels in electrical insulation, heat resistance, fabrication capability and storage stability The fabrication capability among other important qualities includes possible molding at low pressure.

The adhesive composition according to the invention is applicable particularly to the assembly of component parts for use in electronic equipment. Further, it can be suitably used as a one-pack type adhesive in industrial sectors of automobiles, aircrafts and the like.

Many other objects and advantages of the invention will be better understood from the following description.

More specifically, the invention provides an adhesive composition that comprises (I) 100 parts by weight of an epoxy resin, (II) 5 to 50 parts by weight of an acrylonitrile-butadiene or methacrylonitrile-butadiene copolymer or a combination thereof, (III) a maleimide derivative meeting a weight ratio of $1 \leq (II)/(III) \leq 10$, and (IV) 0.5 to 20 parts by weight of an imidazole compound.

DESCRIPTION OF THE INVENTION

Adhesive compositions contemplated under the present invention are comprised essentially of (I) an epoxy resin, (II) a carboxyl group-containing acrylonitrile-butadiene and/or methacrylonitrile-butadiene copolymer, (III) a maleimide derivative and (IV) an imidazole compound, each such component being described in more detail below.

Component (I) used for purposes of the invention is an epoxy resin in which two or more epoxy groups are chemically bonded to one molecule. Typical examples include glycidyl ether type epoxy resins such as a bisphenol A-epichlorohydrin epoxy resin a cresol-novolak epoxy resin, glycidyl ester epoxy resins, aliphatic epoxy resins, alicyclic epoxy resins, rubber modified epoxy resins, epoxy resins halogenated to provide flame resistance and the like. Preferred for use in structural materials of electronic equipment are epoxy resins having a chlorine ion content of smaller than 10 ppm and a hydrolyzable chlorine content of less than 0.1%.

Component II is not specifically restricted but may be chosen from one or more rubber-like copolymers composed of unsaturated nitriles such as acrylonitrile or methacrylonitrile and conjugated dienes such as 1,3-butadiene. The copolymer may have a carboxy group-containing monomer of 0.1 to 20% by mol, preferably 0.4 to 10% by mol.

Component III represents a maleimide derivative having in the molecule at least one maleimide group of the formula

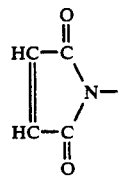

which derivative results from reaction of maleic anhydride with an amine to thereby dehydrate and cyclize maleiamidic acid. Suitable amines include diamines, preferably of an aromatic class taking heat resistance and rubber curability in view. As diamines there may be used methaphenylene diamine, m- or p-xylene diamine, 1,4-cyclohexane diamine, methylene dianiline, oxylene dianiline, diaminodiphenyl sulfone, isophorone diamine and the like.

Component IV is an imidazole compound of the formula

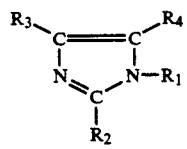

where $R_1$, $R_2$, $R_3$ and $R_4$ are a hydrogen atom, or an alkyl group of 1 to 20 carbon atoms, a benzene nucleus-containing substituent group or a methylol group. This component serves to cure component I or the epoxy resin. In the above formula, either one or both of $R_3$ and $R_4$ are preferably a methylol group. Specific examples of component IV are products commercially available such as Curezole 2PHZ and Curezole 2P4MHZ from Shikoku Kasei Kogyo K. K. Included in component IV are imidazoles derived from the addition of trimellitic acid, triazine, isocyanuric acid or the like to the formula in question. Better chosen are imidazole compounds of potential reactivity with component I.

Component II should be added in an amount of from 5 to 50 parts by weight, preferably 10 to 30 parts by weight based on 100 parts by weight of component I. Less than 5 parts invites excessive fluidity, making the resultant adhesive layer irregularly thick. More than 50 parts would be too viscous for full and complete adhesion to a corresponding structural material and also liable to adversely affect the electrical insulation peculiar to component I.

Component IV should range in amount from 0.5 to 20 parts by weight, preferably 1 to 15 parts by weight, more preferably 4 to 10 parts by weight, per 100 parts by weight of component I. This component if smaller than 0.5 part would not be effective for curing component I and hence hazardous to heat resistance and other important properties and if greater than 20 parts would render the resulting cured product physically weak having particular regard to heat resistance at the glass transition temperature.

Component III depends in amount upon the amount of component II and should meet the equation of $1 \leq (II)/(III) \leq 10$ on a weight basis. Below 1 in (II)/(III) would be responsible for inadequate peel strength, whereas above 10 would lead to an adhesive composition lacking storage stability.

Various other additives may be incorporated which are selected for example from inorganic fillers such as calcium carbonate, clay, mica and the like, organic fillers such as particulate silicone, particulate fluorine and the like, ionic or nonionic curatives for component II, flame retardants such as antimony trioxide, aluminum hydroxide and the like, surface treating agents such as silane coupling agents and the like, colorants and the like.

EXAMPLES

The following examples are provided to further illustrate the present invention but should not be regarded as limiting the invention. In these examples all formulations are indicated by weight part unless otherwise noted.

Different adhesive compositions were prepared as shown in the table and dissolved in methyl ethyl ketone (MEK) to give varnishes of various solid contents. The varnishes each were applied over a release film of various polyethylene terephthalate (PET) in a dry coatweight of 100μ. The resultant films after being dried were superimposed one on the other in a pair by means of a roll laminator, whereupon there was provided a film-like adhesive uncured.

Performance evaluation was made of all the adhesives for storage stability, thickness uniformity, adhesive strength, heat resistance on soldering and electrical insulation under the conditions given below and with the results tabulated along with the formulations.

Storage Stability

The film-like adhesive was allowed to stand at a temperature of 20° C. and at a relative humidity of 65%. Resin flow was determined with time. To this and the film was cut as a test specimen to a square of 50±0.5 mm, followed by measurement of the weight ($W_1$) to 0.001 g. The specimen was pressed on a hot press at 120° C. and at 5 kg/cm$^2$ for 10 minutes and thereafter taken out of the press and cooled at room temperature. The specimen was cut at from the center to a square of 35+0.5 mm, and the weight ($W_2$) was measured to 0.001 g.

Resin flow counted from the following equation.

$$resin\ flow\ (\%) = (W_1 - 2W_2)/W_1 \times 100$$

The resin flow value (F) was examined for the film-like adhesive just prepared ($F_0$) and after disposed at 22° C. and at 65% RH for 30 days ($F_1$). $F_1/F_0 \geq = 0.5$ was graded as acceptable and $F_1/F_0 < 0.5$ as unacceptable, provided that Fo was $\geq 10$.

Adhesive Strength

The film-like adhesive was laminated over a 1.6-mm thick substrate plate on a roll laminator maintained at 120° C. Used as the substrate was a glass epoxy plate provided with a 35-μ thick copper foil treated on one side with Black Oxide. Curing was done at 170° C. for one hour under the tabulated pressures with an untreated side of the copper foil brought into intimate contact with the adhesive film. A cut of 10±0.1 mm in width was formed in the foil with a cutter knife, and the foil was peeled at from one end to a given length.

Adhesive strength was determined by the JIS C-6481 procedure.

Thickness Uniformity

The copper-clad laminate made in the adhesion test was subjected to microscopic examination of thicknesses at ten optional regions as seen cross-sectionally. In the table the symbol "o" denotes an acceptable thickness irregularity within ±5μ and "x" an unacceptable irregularity outside that average.

Heat Resistance on Soldering

A square test piece of 25±1 mm, cut out of the laminate used in the adhesion test, was allowed to float in a soldering both held at 260° C. with the copper foil dipped into the liquid. Dipping was done for 60 seconds. The test piece was taken out of the bath and cooled at room temperature, followed by naked inspection of blistering and peeling.

The symbol "o" means no blister nor peel and "x" blister.

Electrical Insulation

The adhesive film was laminated on to a comb-shaped pattern wiring board of a line-space of 0.2 mm−0.2 mm by means of a roll laminator held at 100° C. Curing was effected in an autoclave at 5 torr, at 170° C. and at 7 kg/cm$^2$ for one hour.

Measurement was made of line insulation resistivity after applied at DC 500 V for one minute.

As appears clear from the tabulated results, adhesive compositions representing the invention in Examples 1 to 8 have proved satisfactory in respect of all the test characteristics.

TABLE

|  | Examples | | | | | | | |
|---|---|---|---|---|---|---|---|---|
|  | 1 | 2 | 3 | 4 | 5 | 6 | 7 | 8 |
| epichlorohydrin-bisphenol A | 60 | 30 | 50 | 50 | 50 | 50 | 40 | 45 |

TABLE-continued

| | | | | | | | | |
|---|---|---|---|---|---|---|---|---|
| epoxy resin (epoxy equivalent 475)[1] epichlorohydrin-bisphenol A | 10 | 20 | 50 | 20 | 25 | 20 | 30 | 25 |
| epoxy resin (epoxy equivalent 190)[2] cresol-novolak epoxy resin (epoxy equivalent 220)[3] | 30 | 50 | — | 30 | 25 | 30 | 30 | 30 |
| carboxyl group-containing acrylonitrile-butadiene copolymer (II) | 15[4] | 5[4] | 50[4] | 20[4] | 10[4] | 10[4] | 30[16] | 20[15] |
| maleimide derivative (III) | 3[5] | 0.5[6] | 25[7] | 10[5] | 10[6] | 5[5] | 10[7] | 3[5] |
| imidazole compound (IV) | 5[9] | 20[11] | 0.5[10] | 4[10] | 8[10] | 8[12] | 15[12] | 10[8] |
| peroxide[13] | — | — | — | 0.2 | 0.1 | — | 0.3 | 0.2 |
| (II/III) | 5 | 10 | 2 | 3 | 1 | 2 | 3 | 6.7 |
| solid content (%, MEK) | 60 | 78 | 45 | 55 | 72 | 60 | 45 | 57 |
| pressing (kgf/cm$^2$) | 15 | 7 | 25 | 20 | 15 | 10 | 20 | 15 |
| storage stability | 0.55 | 0.75 | 0.60 | 0.65 | 0.60 | 0.70 | 0.75 | 0.80 |
| thickness uniformity | ○ | ○ | ○ | ○ | ○ | ○ | ○ | ○ |
| adhesive strength (kgf/cm$^2$) | 1.8 | 1.6 | 1.4 | 2.1 | 1.8 | 1.8 | 1.7 | 1.9 |
| heat resistance on soldering | ○ | ○ | ○ | ○ | ○ | ○ | ○ | ○ |
| electrical insulation (Ω) | $4.7 \times 10^{12}$ | $7.2 \times 10^{12}$ | $7.8 \times 10^{11}$ | $3.4 \times 10^{12}$ | $5.2 \times 10^{12}$ | $5.5 \times 10^{12}$ | $5.6 \times 10^{11}$ | $2.4 \times 10^{12}$ |

| | Comparative Examples | | | | | | | |
|---|---|---|---|---|---|---|---|---|
| | 1 | 2 | 3 | 4 | 5 | 6 | 7 | 8 |
| epichlorohydrin-bisphenol A epoxy resin (epoxy equivalent 475)[1] | 50 | 30 | 60 | 30 | 60 | 50 | 60 | 50 |
| epichlorohydrin-bisphenol A epoxy resin (epoxy equivalent 190)[2] | 20 | 60 | 10 | 20 | 10 | 25 | 15 | 25 |
| cresol-novolak epoxy resin (epoxy equivalent 220)[3] | 30 | 10 | 30 | 50 | 30 | 25 | 25 | 25 |
| carboxyl group-containing acrylonitrile-butadiene copolymer (II) | — | 60[4] | 15[4] | 20[4] | 10[4] | 5[4] | 20[17] | 10[4] |
| maleimide derivative (III) | 5[7] | 30[5] | 30[5] | 1.3[5] | 5[5] | 0.7[5] | 15[5] | 5[10] |
| imidazole compound (IV) | 5[9] | 1[11] | 5[10] | 4[10] | — | 30[11] | 10[12] | 8[12] |
| peroxide[13] | — | — | 0.2 | 0.2 | 0.1 | — | 0.2 | — |
| (II/III) | 0 | 2 | 0.5 | 15 | 2 | 7 | 1.3 | 2 |
| solid content (%, MEK) | 82 | 38 | 57 | 52 | 74 | 75 | 52 | 60 |
| pressing (kgf/cm$^2$) | 7 | 30 | 15 | 20 | 15 | 7 | 15 | 10 |
| storage stability | 0.65 | × (F$_0$ = 8) | 0.70 | 0.30 | 0.80 | 0.60 | 0.85 | 0.30 |
| thickness uniformity | × | ○ | ○ | ○ | ○ | ○ | ○ | ○ |
| adhesive strength (kgf/cm$^2$) | 1.4 | 1.2 | 0.7 | 1.8 | 2.0 | 1.5 | 2.1 | 1.9 |
| heat resistance on soldering | ○ | ○ | ○ | ○ | × | × | × | ○ |
| electrical insulation (Ω) | $7.8 \times 10^{12}$ | $4.8 \times 10^{10}$ | $2.7 \times 10^{12}$ | $4.1 \times 10^{12}$ | $2.1 \times 10^{11}$ | $3.3 \times 10^{12}$ | $2.1 \times 10^{10}$ | $7.7 \times 10^{12}$ |

Notes to Table:
[1] Epikote 1001, Yuka-Shell Epoxy Co.
[2] Epikote 828, Yuka-Shell Epoxy Co.
[3] ESCN 220F, Sumitomo Chemicals Co.
[4] Mooney viscosity [ML$_{1+4}$ (100° C.)] 48, acrylonitrile content 27 wt. %, carboxyl group-containing monomer 4 mol %

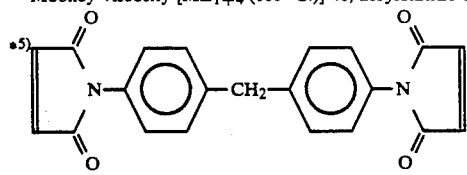

[5]

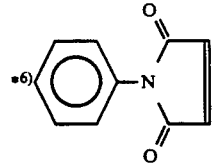

[6]

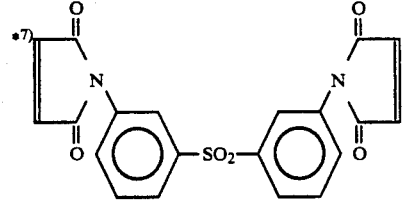

[7]

[8] Curezole C$_{11}$Z, Shikoku Kasei Kogyo K.K.

TABLE-continued

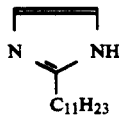
*9)Curezole C17Z, Shikoku Kasei Kogyo K.K.

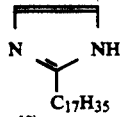
*10)Curezole 2MZ AZINE, Shikoku Kasei Kogyo K.K.

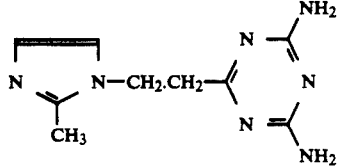
*11)Curezole 2PHZ, Shikoku Kasei Kogyo K.K.

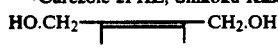
*12)Curezole 2P4MHZ, Shikoku Kasei Kogyo K.K.

*13)Percumyl D, Nippon Fats and Oils Co.
*14)Mooney viscosity 50, acrylonitrile content 27 wt. %, carboxyl group-containing monomer 12 mol %
*15)Mooney viscosity 48, acrylonitrile content 27 wt. %, carboxyl group-containing monomer 1 mol %
*16)Mooney viscosity 53, acrylonitrile content 27 wt. %, carboxyl group-containing monomer 1 mol %
*17)Mooney viscosity 63, acrylonitrile content 41 wt. %, carboxyl group-containing monomer 0 mol %

What is claimed is:

1. An adhesive composition consisting essentially of:
   (I) an epoxy resin selected from the group consisting of a glycidyl ether epoxy resin, a cresol-novolak epoxy resin, a glycidyl ester epoxy resin, an aliphatic epoxy resin, an alicyclic epoxy resin and a halogenated epoxy resin;
   (II) a carboxyl group-containing acrylonitrile-butadiene or methacrylonitrile-butadiene copolymer or a combination thereof in an amount of from 5 to 50 parts by weight per 100 parts by weight of the epoxy resin (I);
   (III) a maleimide compound in an amount that satisfies the following equation: $1 \leq (II)/(III) \leq 10$ on a weight basis; and
   (IV) an imidazole compound in an amount of from 0.5 to 20 parts by weight per 100 parts by weight of the epoxy resin (I).

2. The composition of claim 1, wherein the epoxy resin is a bisphenol A-epichlorohydrin epoxy resin.

3. The composition of claim 1, wherein the epoxy resin has a chlorine ion content of less than 10 ppm and a hydrolyzable chlorine content of less than 0.1%.

4. The composition of claim 1, wherein said copolymer (II) has a carboxyl group-containing monomer of from 0.1 to 20% by mol.

5. The composition of claim 1, wherein said maleimide compound (III) contains at least one group of the formula:

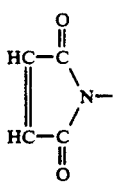

6. The composition of claim 1 wherein said imidazole compound (IV) is a compound of the formula:

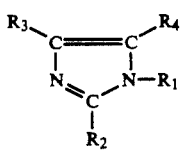

where $R_1$, $R_2$, $R_3$ and $R_4$ are each a hydrogen atom, a alkyl group of 1 to 20 carbon atoms, a methylol group, or a substituted benzene ring.

7. The composition of claim 6, wherein $R_3$ or $R_4$ are a methylol group.

8. The composition of claim 1, wherein said copolymer (II) is present in an amount of from 10 to 30 parts by weight per 100 parts by weight of the epoxy resin (I).

* * * * *